United States Patent

[11] 3,593,741

[72] Inventors: Hubert Odenthal, Wombach; Eckard Auditor, Partenstein; Max-Otto Wintterlin, Lohr, all of, Germany
[21] Appl. No.: 841,288
[22] Filed: July 14, 1969
[45] Patented: July 20, 1971
[73] Assignee: G. L. Rexroth GmbH, Lohr am Main, Germany
[32] Priority: July 13, 1968
[33] Germany
[31] P 17 75 178.9

[54] COMPOUND RELIEF VALVE
7 Claims, 1 Drawing Fig.

[52] U.S. Cl. .................................... 137/495, 137/491, 251/26
[51] Int. Cl. .................................... F16k 17/10
[50] Field of Search .................................... 137/495, 489, 599; 251/26; 138/40

[56] References Cited
UNITED STATES PATENTS

| | | | |
|---|---|---|---|
| 549,224 | 11/1895 | Atkinson | 137/599 X |
| 795,448 | 7/1905 | McGonagle | 137/599 X |
| 1,719,686 | 7/1929 | Browne | 137/489 |
| 2,417,994 | 3/1947 | Sheets | 251/26 X |
| 3,180,355 | 4/1965 | Long | 137/495 X |
| 3,225,785 | 12/1965 | Goike | 137/489 X |
| 3,282,552 | 11/1966 | Sommese | 251/26 |

FOREIGN PATENTS

| 723,307 | 8/1942 | Germany | 137/489 |
|---|---|---|---|

Primary Examiner—M. Cary Nelson
Assistant Examiner—R. B. Rothman
Attorney—Michael S. Striker ABSTRACT: A compound relief valve wherein the pilot valve is installed in a branch conduit connecting the high-pressure line with the reservoir and wherein the chamber of the main valve is connected with the branch conduit upstream of the pilot valve by two auxiliary conduits each of which contains an adjustable flow restrictor. The piston of the main valve opens at a speed which is determined by one of the flow restrictors and closes at a speed which is determined by the other flow restrictor.

PATENTED JUL 20 1971 3,593,741
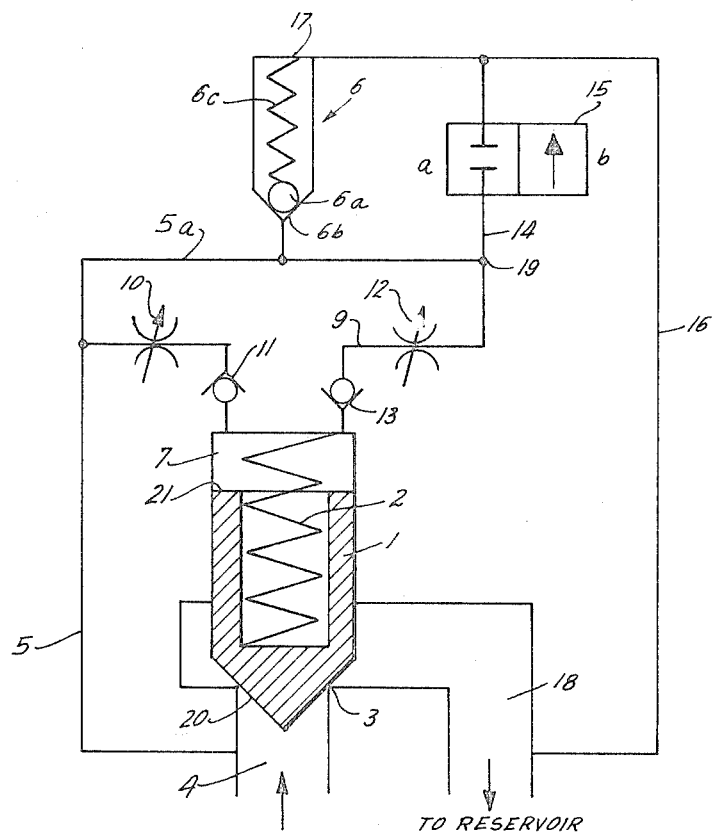
TO RESERVOIR
INVENTORS
HUBERT ODENTHAL
ECKARD AUDITOR
MAX-OTTO WINTTERLIN
BY Michael S. Striker
ATTORNEY

COMPOUND RELIEF VALVE

BACKGROUND OF THE INVENTION

The present invention relates to relief valves in general, and more particularly to improvements in so-called compound relief valves wherein the opening of a pilot valve in response to a rise in fluid pressure beyond a predetermined value causes opening of the main valve which then establishes communication between a high-pressure line and a reservoir.

It is already known to provide a compound relief valve with a flow restrictor which determines the speed at which the valve member of the main valve moves to open position subsequent to opening of the pilot valve. The flow restrictor is mounted in such position that it controls the flow of fluid to the chamber of the main valve as well as to the pilot valve. A drawback of such relief valves is that the speed at which the valve member opens cannot be influenced to a desired degree.

It is also known to provide a fixed flow restrictor between the chamber of the main valve and the pilot valve. The restrictor controls the flow of fluid to as well as from the chamber of the main valve, i.e., it determines the rate of speed of the valve member toward open as well as toward closed position. Such proposal is not entirely satisfactory because the flow restrictor does not permit for sufficiently accurate determination of closing and opening times; this is due to the fact that the pressure differential at the opposite sides of the flow restrictor is greater when the valve member of the main valve moves toward open position so that, if the flow restrictor is designed to insure an optimum closing time for the valve member, it cannot insure an equally satisfactory opening time.

SUMMARY OF THE INVENTION

An object of our invention is to provide a compound relief valve wherein the time required for closing of the valve member of the main valve can be selected with the same degree of accuracy as the time which is required for opening of the valve member, and wherein the opening time can be carried independently of the closing time or vice versa.

Another object of the invention is to provide a compound relief valve wherein the opening and/or closing times for the valve member of the main valve can be readily selected in such a way that the main valve can be opened or closed without undesirable pressure pulsations and chatter.

A further object of the invention is to provide a compound relief valve which is particularly suited for regulating the flow of pressurized hydraulic fluids and wherein the valve member of the main valve can be moved toward open or closed position in a fully automatic way as a function of setting of the pilot valve, as well as manually, but always in such a way that the time required for opening or closing is determined in advance and is best suited to prevent pulsations and/or chatter.

An additional object of the invention is to provide a novel system of flow restrictors for use in a compound relief valve.

The improved compound relief valve is utilized to regulate the flow of pressurized fluid from a high-pressure line or chamber to a reservoir or into the atmosphere and comprises a main valve including a seat, a chamber and a valve member movable in the chamber and normally engaging the seat to thereby seal the high-pressure line from the reservoir, a branch conduit connecting the high-pressure line with the reservoir, a normally closed pilot valve provided in the branch conduit to prevent the flow of fluid from the high-pressure line to the reservoir when the fluid pressure in the high-pressure line remains below a predetermined value, a pair of auxiliary conduits each connecting the chamber of the main valve with the branch conduit upstream of the pilot valve, and separate (preferably adjustable) flow restrictor means provided in each auxiliary conduit. One of the flow restrictor means determines the time required by the valve member of the main valve to move to open position, and the other flow restrictor means determines the time required by the valve member to move to closed position. Each of these flow restrictor means can be set to furnish an optimum time for the respective movement of the valve member.

The novel features which are considered as characteristic of the invention are set forth in particular in the appended claims. The improved compound relief valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic partly sectional view of a compound relief valve which embodies the invention.

DESCRIPTION OF THE PREFERRED EMBODIMENTS

Referring to the drawing in detail, the compound relief valve therein shown comprises a valve body or housing defining a seat 3 for the valve member or piston 1 of the main valve. The piston 1 is biased against the seat 3 by a helical main valve spring 2 accommodated in the main valve chamber 7. The seat 3 is located between a high-pressure line 4 and a low-pressure or return line 18 which is connected to or forms part of the reservoir. The purpose of the piston 1 is to move away from the illustrated closed position when the pressure of hydraulic fluid in the line 4 reaches a predetermined value. This high-pressure line 4 communicates with a branch conduit 5 having a portion 5a which accommodates a pilot valve here shown as a check valve 6 serving to normally seal the branch conduit 5 from a return conduit 16 which is in communication with the reservoir by way of the low-pressure line. The conduits 5, 5a, 16 together form a composite branch conduit which contains the pilot valve 6 and extends between the lines 4, 18. The pilot valve 6 has a valve member or ball 6a biased against its seat 6b by a pilot valve spring 6c which is installed in the pilot valve chamber 17. A first connecting or auxiliary conduit 8 extends between the chamber 7 of the main valve and branch conduit 5; this conduit 8 accommodates an adjustable flow restrictor 10 and a check valve 11 which permits flow of fluid into the chamber 7. A second connecting or auxiliary conduit 9 between the portion 5a of the branch conduit 5 and the chamber 7 contains a second adjustable flow restrictor 12 and a check valve 13 which permits outflow of fluid from the chamber 7. A further conduit 14 connects the branch conduit 5 with the return conduit 16 and contains a two-way solenoid-operated auxiliary valve 15 which can be set to move its valve member to the closed position a or to the closed position b. A remote control conduit 19 communicates with the branch conduit 5 at the junction of the portion 5a with the conduits 9 and 14.

The operation:

When the piston 1 assumes the illustrated closed position, it seals the high-pressure line 4 from the low-pressure line 18 whereby the fluid in the line 4 applies pressure to its relatively small front end surface 20. The pressure of fluid in line 4 is substantially identical with pressure of fluid in the chamber 7, and such pressure acts on the relatively large rear end surface 21 of the piston 1 so that it assists the bias of the main valve spring 2 to maintain the piston in sealing engagement with the seat 3. The piston 1 remains in closed position as long as the pressure in the line 4 remains below a predetermined pressure which is determined by the bias of spring 6c in the chamber 17 of the pilot valve 6. THe feature that the surface 21 is larger than the surface 20 is of advantage because the piston 1 is safely held in closed position when the pressure of fluid in the line 4 remains below the aforementioned predetermined value.

If the fluid pressure in line 4 exceeds such predetermined value, the ball 6a moves away from its seat 6b and permits fluid to flow from the branch conduit 5 into the chamber 17 and thence into the low-pressure line 18 and reservoir by way of the return conduit 16. Thus, the chamber 7 is then free to communicate with the reservoir by way of the auxiliary conduit 9, its check valve 13 and flow restrictor portion portion 5a of branch conduit 5, chamber 17 of the pilot valve 6, and return conduit 16. The fluid pressure at the rear end surface 21 drops and the piston 1 moves to open position against the resistance of spring 1 to permit direct flow of fluid from the high-pressure line 4 into the low-pressure line 18. Fluid which is being expelled from the chamber 7 must flow through the restrictor 12 whereby the setting of this restrictor determines the rate at which the piston 1 moves toward its open position. Thus, the flow restrictor 12 constitutes a means for regulating the speed of movement of the piston 1 away from closed position.

If the pressure of fluid in the high-pressure line 4 drops below the aforementioned predetermined valve, the ball 6a of the pilot valve 6 returns into sealing engagement with the seat 6b and seals the chamber 7 from the reservoir. Fluid then flows from the high-pressure line 4, through the branch conduit 5 and auxiliary conduit 8 to enter the chamber 7 and to effect return movement of the piston 1 toward closed position at a speed determined by the setting of the flow restrictor 10. Thus, the latter serves as a means for determining the speed of movement of the piston 1 from open toward closed position.

If it becomes necessary to open the main valve while the pressure of fluid in the high-pressure line 4 is below the predetermined valve which is necessary to effect opening of the pilot valve 6, the two-way auxiliary valve 15 is actuated to permit flow of fluid from the branch conduit portion 5a (and hence from the chamber 7 by way of auxiliary conduit 9) into the return conduit 16 and back to the reservoir. This is the position b of the valve member in the auxiliary valve 15. The speed at which the piston 1 moves toward open position in response to opening of the auxiliary valve 15 is again controlled by the adjustable flow restrictor 12. The flow restrictor 10 regulates the speed of movement of piston 1 toward closed position when the valve member of the auxiliary valve 15 is caused to return to the closed position a.

The remote control conduit 19 is opened to effect movement of the piston 1 to open position while the pressure of fluid in the high-pressure line 4 remains below the predetermined value. The fluid then escapes from chamber 7 by flowing through the auxiliary conduit 9, check valve 13 and flow restrictor 12 directly into the remote control conduit 19. When the latter is closed, the chamber 7 receives fluid at the rate determined by the adjustable flow restrictor 10 which thus regulates the speed of movement of piston 1 toward closed position.

The flow restrictors 10, 12 are preferably designed in such a way that they always permit flow of at least some fluid, i.e., they cannot completely seal the respective auxiliary conduits 8 and 9. This is normally desirable to prevent hydraulic blocking of the compound relief valve.

That part of the branch conduit 5 which extends between the high-pressure line 4 and the seat 6b of the pilot valve 6 is preferably free of any flow restricting means. The auxiliary valve 15 serves to effect movement of the piston 1 to open position independently of the setting of the pilot valve 6. This valve 15 is mounted in such a way that fluid can bypass the pilot valve 6 when the valve member of the valve 15 moves to the open position b; such fluid then flows from the high-pressure line 4 into the reservoir by way of the branch conduit 5, its portion 5a, auxiliary valve 15, conduit 16 and line 18. Fluid is also permitted to flow from the chamber 7 via check valve 13, flow restrictor 12 and auxiliary valve 15 into the return conduit 16. The remote control conduit 19 performs a function which is similar to that of the auxiliary valve 15, with the exception that it need not discharge the fluid into the return conduit 16.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desired to be protected by Letters Patent is set forth in the appended claims:

1. A compound relief valve for regulating the flow of pressurized fluid from a high-pressure line to a reservoir, comprising a main valve including a seat, a chamber and a valve member movable in said chamber and normally engaging said seat to thereby seal the high-pressure line from the reservoir; a branch conduit connecting the high-pressure line with the reservoir; a normally closed pilot valve provided in said conduit to prevent the flow of fluid when the fluid pressure in the line remains below a predetermined value, a pair of auxiliary conduits each connecting said chamber with said branch conduit upstream of said pilot valve; flow restrictor means provided in each of said auxiliary conduits; and check valve means provided in each of said auxiliary conduits, one of said check valve means being arranged to permit and the other being arranged to prevent flow of fluid from said chamber.

2. A compound relief valve as defined in claim 1, wherein said branch conduit is free of flow-restricting means in the region between the high-pressure line and said pilot valve.

3. A compound relief valve as defined in claim 1, further comprising a normally closed auxiliary valve connecting the reservoir with said branch conduit between said pilot valve and said auxiliary conduits.

4. A compound relief valve as defined in claim 3, wherein said auxiliary valve is a two-way solenoid-operated valve.

5. A compound relief valve as defined in claim 1, further comprising remote control means connected with said branch conduit between said pilot valve and said auxiliary conduits to permit escape of fluid from said chamber independently of said pilot valve.

6. A compound relief valve as defined in claim 5, wherein said remote control means comprises a normally sealed conduit.

7. A compound relief valve is defined in claim 1, wherein each of said flow restrictor means is adjustable between a plurality of positions and wherein each thereof permits at least some fluid to flow through the respective auxiliary conduit in each position thereof.